United States Patent [19]

Skrobisch

[11] Patent Number: 4,825,992
[45] Date of Patent: May 2, 1989

[54] MAGNETIC TORQUE LIMITING CLUTCH HAVING OVERLOAD DISCONNECTION MEANS

[76] Inventor: Alfred Skrobisch, 64 Fulton Blvd., Commack, N.Y. 11725

[21] Appl. No.: 136,014

[22] Filed: Dec. 21, 1987

[51] Int. Cl.$^4$ .......................... F16D 7/00; F16D 27/01
[52] U.S. Cl. .............. 192/56 L; 192/84 PM; 464/29; 464/30
[58] Field of Search .............. 192/56 R, 56 L, 84 PM; 464/29, 30

[56] References Cited

U.S. PATENT DOCUMENTS

| | | | |
|---|---|---|---|
| 447,413 | 3/1891 | Perry | 192/56 R |
| 1,914,795 | 6/1933 | Andres | 192/56 L |
| 2,253,466 | 8/1941 | Grohn | 192/56 R |
| 2,796,160 | 6/1957 | Harmes | 192/84 PM X |
| 3,194,371 | 7/1965 | Rabinow | 192/84 PM X |
| 3,240,304 | 3/1966 | Wickershom | 192/84 PM X |
| 4,271,944 | 6/1981 | Hanson | 192/56 L |
| 4,651,856 | 3/1987 | Skrobisch | 192/56 R |

FOREIGN PATENT DOCUMENTS 2932661  3/1981 Fed. Rep. of Germany ........ 192/84 PM Primary Examiner—Rodney H. Bonck
Assistant Examiner—Richard M. Lorence
Attorney, Agent, or Firm—Edward H. Loveman

[57] ABSTRACT

This torque limiting clutch has a motor driven hub carrying two concentric cup-shaped rings with a cylindrical permanent magnet therebetween. Keeper plates are pivotally secured to the hub and overlay coplanar edges of the rings to which the keepers are magnetically attracted. The hub has an extension on which freely rotates a power output disk provided with projecting fingers that engage the keepers when they are in radial positions with respect to the hub. When an overload is applied to the output disk, the fingers turn the keepers until they are disengaged from the disk. The power output disk and hub are thus released to turn freely independently of each other, without generating frictional heat therebetween.

11 Claims, 2 Drawing Sheets

MAGNETIC TORQUE LIMITING CLUTCH HAVING OVERLOAD DISCONNECTION MEANS

BACKGROUND OF THE INVENTION

1. Field of the Invention

This invention relates to the art of magnetically controlled torque limiting clutches, and more particularly concerns means for automatically releasing an overload from the driving motor of a magnetic torque limiting clutch.

2. Description of the Prior Art

This invention involves improvements over the torque limiting type of magnetic clutch described in my prior U.S. Pat. No. 4,651,856 issued Mar. 24, 1987. In that patent there is described a torque limiting clutch having two or more cylindrical concentric, coaxial magnetic rings and a cylindrical permanent magnet disposed radially between the rings. Coplanar edges of the rings at one end thereof are abutted to a magnetic driven member which may be a flat plate or disk. Mechanical drive means which engage the other ends of the rings are driven rotationally by a motor. The output disk is operatively connected to a driven load via a pulley, a gear, or a driven shaft. If the clutch is overloaded, slippage occurs between the output disk and the abutted magnetic rings. This clutch is useful where the occurrence of the overload can be noticed immediately so that the motor can be stopped at once. If the motor continues to run with a blocked load or overload delivering torque up to the limit of the clutch, heat will be generated frictionally between the magnetic rings and the slipping output disk. The magnetic rings and output disk will absorb this heat quickly. With small torque limiters capable of allowing torques and speeds whose product can be one horsepower or more, the resulting heat may damage or destroy the clutch. The need therefore exists for some means to prevent the generation of this destructive heating in the event of a clutch overload.

SUMMARY OF THE INVENTION

It is the principal object of the present invention to provide means for effectively disconnecting the overload from the driving motor in a magnetic torque limiting clutch of the type described, and thus, prevent destructive frictional heat generation in the clutch. According to the invention, the concentric magnetic rings of the clutch are cup-shaped and are keyed to a motor driven hub. Pivotally mounted on the hub are circumferentially spaced magnetic keepers overlaying the cylindrical permanent magnet disposed between the rings. The keepers are generally pivoted flat plates, and are held in abutment with the coplanar faces of the rings by magnetic attraction. An output disk or plate is spaced from the coplanar adjacent ends of the rings and is provided with axially directed fingers which are engaged by the keepers when in driving position. If the load upon the driven disk becomes too high, i.e. the rated torque on the keepers is exceeded, the keepers while still pressed magnetically to the rings, will be turned inwardly of the rings until the fingers slip off the keepers. The output disk will thus be released from the motor drive and stop rotating. The rest of the drive assembly will continue to turn free of the load. Since the prior experienced generation of frictional heat on overload is eliminated, the motor may continue to turn safely. The torque limiter clutch may be reset after it has disconnected the overload. First the motor is stopped, then the inwardly turned keeper plates may be manually turned back to radially extending positions. When the motor is started again the keepers will make contact with the fingers of the output disk and normal drive-through conditions will be reestablished. This clutch construction will operate equally well in both clockwise and counterclockwise drive directions because the keepers can rotate about 90 degrees in either direction from the radial position.

These and other objects and many of the attendant advantages of the invention will be readily appreciated as the same becomes better understood by reference to the following detailed description when considered in connection with the accompanying drawings in which:

DESCRIPTION OF THE PREFERRED EMBODIMENTS

Figure 1:
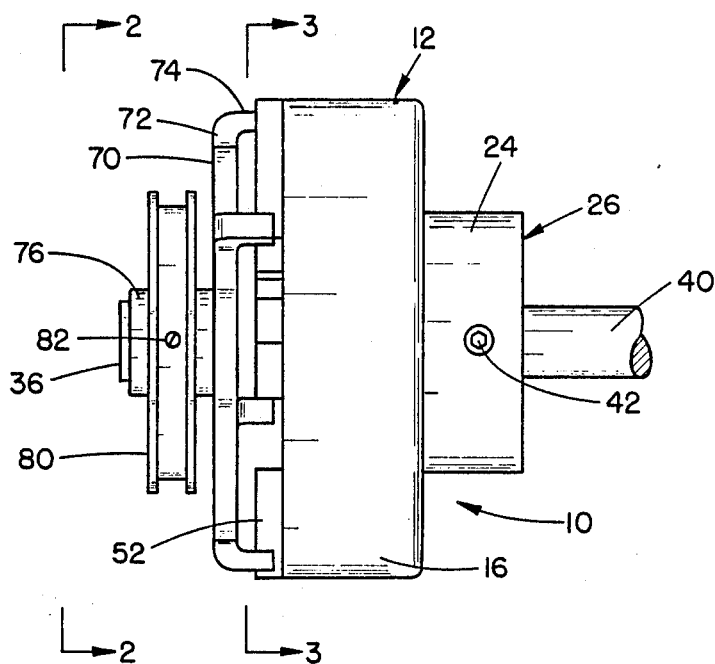
FIG. 1 is a side elevational view of a torque limiting clutch embodying the invention.

Referring now to the drawings wherein like reference characters designate like or corresponding parts throughout, there is illustrated in FIGS. 1-4, a torque limiting clutch generally designated as reference numeral 10, and comprising two cup shaped rings 12, 14 made of magnetizable material such as soft iron. The rings 12, 14 have respective cylindrical, radially spaced, concentric or coaxial walls 16, 18. Secured between the walls 16, 18 is a cylindrical permanent magnet 19. The rings 12, 14, also have annular end walls 20, 22 spaced apart axially of the rings 12, 14. The outer end wall 20 is secured to a radially innermost step 24 of a generally cylindrical hub 26. The inner end wall 22 is secured to a radially intermediate step 28 of the hub 26. The inside of the wall 22 abuts a shoulder 30 on a radially outermost step 32 of the hub 26. From the outermost annular face 34 of the hub 26 extends a cylindrical extension 36. The hub 26 has a central bore 38 which receives motor drive shaft 40 secured to the hub 26 by a set screw 42 (FIG. 1). In the widest portion of the hub 26 axially inward from the face 34 is a plurality of circumferentially spaced holes 44 each of which receive a pin 46. A head 48 of each pin 46 is engaged in a recess 50 in each of four flat, magnetic keeper plates 52. The keeper plates 52 are rotatable on the pins 46 and in abutment with the face 34 of the hub 26 as will now be described.

Figure 3:
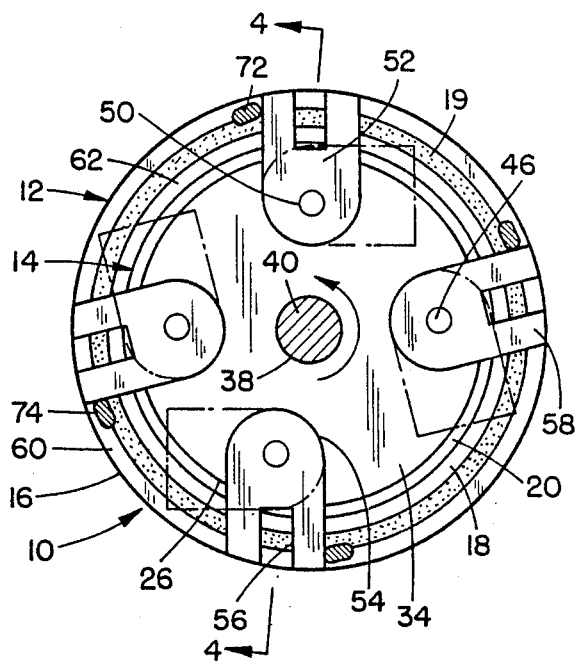
FIG. 3 is a cross sectional view taken along line 3—3 of FIG. 1.
Figure 4:
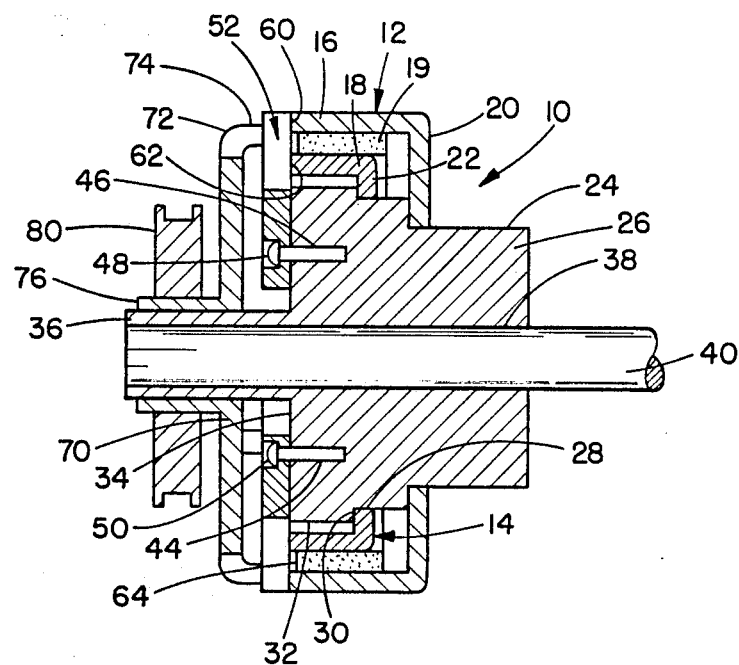
FIG. 4 is an axial cross sectional view taken along line 4—4 of FIG. 3.
Figure 5:
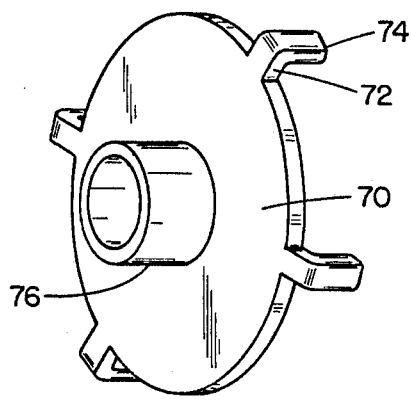
FIG. 5 is a perspective view of the output disk or plate per se.
Figure 6:
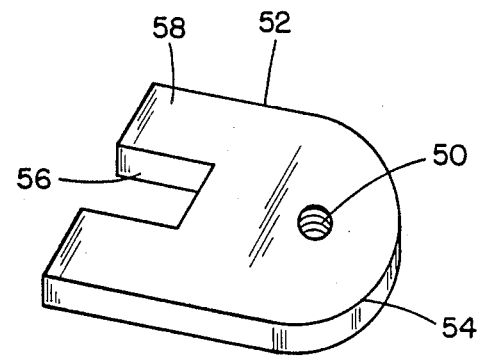
FIG. 6 is an enlarged perspective view of a keeper plate per se.

The keeper plates 52 are flat plates as clearly shown in FIGS. 3 and 6, and have rounded ends 54 in which are the recesses 50. The plates 52 each have a central slot 56 defining two spaced legs 58. These legs overlay and are magnetically attracted to respective flat, annular, coplanar end faces 60, 62 of the cylindrical walls 16, 18 of the magnetic rings 12, 14. The keeper plates 52 are slightly spaced from an adjacent annular end wall 64 of the cylindrical permanent magnet 19 since the end wall 64 is recessed slightly with respect to the end faces of the rings 12,14.

The clutch 10 further comprises a circular driven output plate or disk 70 which has a plurality of circumferentially spaced fingers 72 extending radially outwardly with free ends 74 bent axially of the disk 70; see FIGS. 1–5. The disk 70 has an integral, central cylindrical nipple or sleeve 76 which extends axially outward opposite from the fingers 72. The sleeve 76 turns freely on the cylindrical hub extension 36. A pulley 80 may be secured by set screw 82 on the sleeve 76 to turn with it. In place of the pulley 80 there may be provided a gear or other mechanical power transmission means to drive a load.

Figure 2:
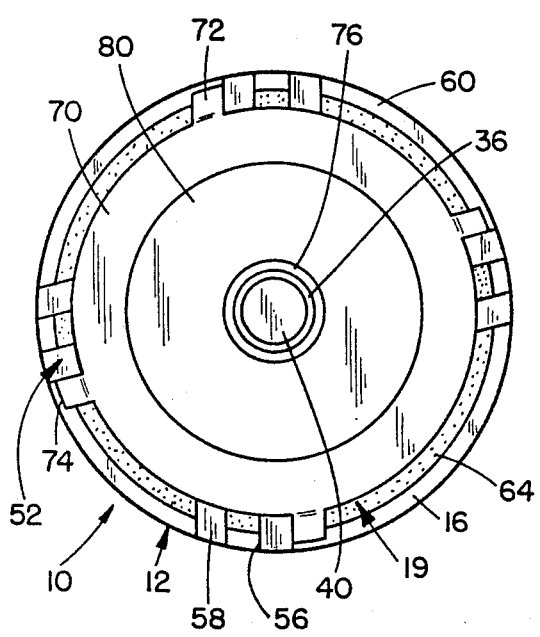
FIG. 2 is an end elevational view taken along line 2—2 of FIG. 1.

In operation of the clutch 10, the keepers 52 will be disposed in the radial positions illustrated in FIGS. 2 and 3 where they engage the fingers 72 of the power output disk 70 when the motor (not shown) drives the shaft 40. The shaft 40 rotates the hub 26 which rotates the rings 12, 14 and the magnet 19. The keepers 52 are attracted magnetically to and overlay the magnetized rings 12, 14, and the magnet 19. The force of magnetic attraction multiplied by the coefficient of friction of the keepers 52 against the ring faces 60, 62, determines the minimum force required to cause the keepers 52 to start slipping. The magnetic circuit does not include the power output disk 70 which is operatively connected to a driven load via the pulley 80 or other transmission member or means. If the driven load torque increases beyond the magnitude for which the clutch is designed, the resulting force on the keepers 52 will cause them to rotate on the pins 46 clockwise or counterclockwise to the dotted line positions shown in FIG. 3, depending on the direction of rotation of the shaft 40 and the hub 26 to which the shaft 40 is fastened. The total angular range of turning of the keepers 52 is about 180 degrees. The keepers 52 will rotate about 90 degrees from the radial midpoint position shown in FIG. 3, either clockwise or counterclockwise. When the keepers 52, turn on the pins 46, the difference in the turning radii of the keepers 52 and the radii of concentric magnetic rings 12, 14 causes the keepers 52, to turn inside the outer ring 12 and thus slip out of the path of the fingers 72, of the power output disk 70, so that the driven load is effectively disconnected from the driving motor the shaft 40 and the hub 26. Since the hub 26 is turning freely, no frictional heat is generated between the disk 70 and the magnetic rings 12, 14. Then the motor can be stopped for resetting the keepers. When the hub 26 stops rotating, a screwdriver or other tool may be inserted in the slots 56 of the keepers 52 to engage the legs 58 and manually turn the keepers 52 to the radial positions shown in FIG. 3. When the overload condition has passed, the motor may be turned on again, to resume driving the load via the engaged keepers 52 and power output disk 70.

Although four keepers 52 and four fingers 72 are shown, it is possible to provide more or less than four keepers, depending on the diameter of the hub and sizes of the keepers. In any case, it is essential that the keepers turn without interference with each other. If desired, the ends 74 of the fingers 72 may have rounded edges so that they will engage and disengage from the keepers without cutting the edges of the keepers.

It should be understood that the foregoing relates to only a limited number of preferred embodiments of the invention, which have been by way of example only and that it is intended to cover all the changes and modifications of the example of the invention herein chosen for the purpose of the disclosure, which do not constitute departures from the spirit and scope of the invention.

What is claimed:

1. A torque limiting clutch, comprising:
   a plurality of concentric magnetizable cup shaped rings having cylindrical, coaxial, side walls and axially aligned annular end walls, said cylindrical walls having coplanar flat, annular end edges;
   permanent magnet means interposed and secured between said cylindrical walls for magnetizing said cylindrical walls;
   a generally cylindrical hub adapted for operatively engaging drive means to rotate said hub, said hub extending axially of said rings and said magnet means, said annular end walls being secured to said hub so that said rings and said magnet means rotate with said hub;
   a plurality of keepers pivotally mounted on said hub and overlaying said magnet means in abutment with said end edges of said cylindrical walls, so that said keepers adhere magnetically to said end edges; and
   a power output disk coaxially mounted on said hub and free to rotate thereon, said disk being adapted to operatively engage a driven load, said disk having spaced projections respectively engageable by said keepers, so that said disk rotates with said keepers, rings and hub when said keepers are engaged with said projections;
   whereby said keepers pivot on said hub to disengage from said projections when said driven load imposes a torque on said disk exceeding a predetermined magnitude, so that said disk can stop rotating and be independent of said hub and said drive means to prevent generation of frictional heat between said disk and said rings, while said drive means continues to rotate said hub.

2. A torque limiting clutch as defined in claim 1, wherein said hub has an axial bore, and a drive shaft inserted in and engaged, with said hub for rotating said hub.

3. A torque limiting clutch as defined in claim 1, wherein said disk has anaxially extending nipple adapted to engage and drive a transmission member.

4. A torque limiting clutch as defined in claim 1, further comprising pivot means on said hub rotatably engaging said keepers, and wherein said keepers are flat plates turnable to assume a first position radial of said hub where said plates engage said projections of said disk, said plates being turnable in their planes angularly to other positions to clear said projections, when said torque exceeds said predetermined magnitude.

5. A torque limiting clutch as defined in claim 4, wherein said keepers have a total range of rotation of approximately 180 degrees with espect to said hub, said first radial position being disposed midway between ends of said range, so that said keepers are operative to drive said disk when said hub is driven selectively in clockwise and counterclockwise directoions.

6. A torque limiting clutch as defined in claim 4, wherein said projections on said disk are fingers having free ends extending axially of said disk to contact said keepers, so that said keepers drive said disk when said keepers are in said first positions radial of said hub, and so that said projections turn said keepers to said other positions when said torque exceeds said predetermined magnitude.

7. A torque limiting clutch, as defined in claim 6, wherein said hub has an axial bore for receiving a drive shaft to rotate said hub.

8. A torque limiting clutch as defined in claim 7, wherein said disk has an axially extending nipple for mounting a driven transmission member such as a pulley, gear, and the like.

9. A torque limiting clutch as defined in claim 8, wherein each of said keeper plates have a pair of spaced legs defining a slot thereinbetween, each of the slots engageable by a tool to rotate said keeper plates from said other positions back to said first positions radially of said hub.

10. A torque limiting clutch as defined in claim 9, wherein said hub has at least two stepped portions of different diameters, said annular end walls being radially secured to said stepped portions respectively.

11. A torque limiting clutch as defined in claim 10, wherein said hub has a tubular extension to define an annular end face on said hub, said nipple being rotatably mounted on and coaxial with said tubular extension to dispose said disk parallel to said annular end face, said keeper plates being pivotally mounted on said annular end face of said hub.

* * * * *